United States Patent
Martin et al.

(10) Patent No.: US 11,676,198 B2
(45) Date of Patent: Jun. 13, 2023

(54) COMPUTER-IMPLEMENTED METHODS OF COMPLETING AN ONLINE TRANSACTION THAT IS PERFORMED VIA A USER COMPUTING DEVICE AND A MERCHANT WEBSITE RUNNING ON A MERCHANT COMPUTING DEVICE

(71) Applicant: Skipify, Inc., Danville, CA (US)

(72) Inventors: Erythean Martin, Danville, CA (US); Rashad Itani, San Jose, CA (US); Jeremiah Anderson, Los Altos, CA (US)

(73) Assignee: SKIPIFY, INC., Danville, CA (US)

( * ) Notice: Subject to any disclaimer, the term of this patent is extended or adjusted under 35 U.S.C. 154(b) by 65 days.

(21) Appl. No.: 16/944,125

(22) Filed: Jul. 30, 2020

(65) Prior Publication Data

US 2021/0035195 A1    Feb. 4, 2021

Related U.S. Application Data

(60) Provisional application No. 62/880,098, filed on Jul. 30, 2019.

(51) Int. Cl.
*G06Q 30/0601* (2023.01)
*G06Q 20/38* (2012.01)

(52) U.S. Cl.
CPC ..... *G06Q 30/0637* (2013.01); *G06Q 20/3829* (2013.01); *G06Q 20/38215* (2013.01); *G06Q 30/0643* (2013.01)

(58) Field of Classification Search
CPC .......... G06Q 30/0637; G06Q 20/3829; G06Q 30/0643
See application file for complete search history.

(56) References Cited

U.S. PATENT DOCUMENTS 5,960,411 A     9/1999  Hailman et al.
8,606,720 B1 *  12/2013 Baker ................ G06Q 30/0635
                                                  705/64

(Continued)

OTHER PUBLICATIONS

Payment card data—know your defense options: choosing and successfully deploying the right security solution Mattsson, Ulf. Database and Network Journal38.4: 3(6). A.P. Publications Ltd. (Aug. 2008) (Year: 2008).*

(Continued)

*Primary Examiner* — Michael Misiaszek
(74) *Attorney, Agent, or Firm* — Su IP Consulting

(57) ABSTRACT

An online transaction with a merchant website is initiated and completed via a single input action by a user. An online transaction application retrieves a first portion of user credit card information from a first storage location and a second portion of the user credit card information from a second storage location, decrypts the first portion with a first decryption key and the second portion with a second decryption key, encrypts and temporarily stores the complete user credit card information, and publishes an order associated with user order information to a pub/sub message bus. In response to the order being published, a headless browser that is connected to the merchant website retrieves and decrypts the unified user credit card information; completes the merchant checkout process; and deletes, erases, or otherwise removes the temporarily stored complete credit card information.

21 Claims, 7 Drawing Sheets

(56) References Cited

U.S. PATENT DOCUMENTS

| | | | |
|---|---|---|---|
| 8,772,263 B2 | 7/2014 | Frey, II et al. | |
| 9,123,069 B1 | 9/2015 | Haynes et al. | |
| 11,171,775 B2* | 11/2021 | Srivastava | H04L 9/0822 |
| 2005/0108104 A1 | 5/2005 | Woo | |
| 2009/0099939 A1 | 4/2009 | Thakur et al. | |
| 2011/0004533 A1 | 1/2011 | Soto et al. | |
| 2012/0254321 A1 | 10/2012 | Lindsay et al. | |
| 2014/0279496 A1 | 9/2014 | Rauh | |
| 2015/0006283 A1 | 1/2015 | Baca et al. | |
| 2015/0193858 A1 | 7/2015 | Reed et al. | |
| 2015/0278922 A1 | 10/2015 | Isaacson et al. | |
| 2017/0351996 A1* | 12/2017 | Fetman | G06Q 10/0833 |
| 2018/0267847 A1* | 9/2018 | Smith | G06F 16/9577 |
| 2019/0122202 A1* | 4/2019 | Sun | G06Q 20/3829 |
| 2019/0147441 A1* | 5/2019 | Li | G06F 21/44 |
| | | | 705/71 |
| 2020/0074114 A1* | 3/2020 | Cheng | G06Q 20/3227 |
| 2021/0021416 A1* | 1/2021 | Colmenares | G06F 16/904 |

OTHER PUBLICATIONS

Payment card data—know your defense options: choosing and successfully deploying the right security solution Mattsson, Ulf. Database and Network Journal 38.4: 3(6). A.P. Publications Ltd. (Aug. 2008). Retrieved via ProQuest. (Year: 2008).*

Non-Published Commonly Owned U.S. Appl. No. 17/073,348, filed Oct. 17, 2020, 36 pages.

* cited by examiner

COMPUTER-IMPLEMENTED METHODS OF COMPLETING AN ONLINE TRANSACTION THAT IS PERFORMED VIA A USER COMPUTING DEVICE AND A MERCHANT WEBSITE RUNNING ON A MERCHANT COMPUTING DEVICE

CROSS-REFERENCE TO RELATED APPLICATION

The present application claims the benefit of U.S. Provisional Application No. 62/880,098, filed Jul. 30, 2019. The aforementioned U.S. Provisional Application, including any appendices or attachments thereof, is hereby incorporated by reference in its entirety.

BACKGROUND

Unless otherwise indicated herein, the approaches described in this section are not prior art to the claims in this application and are not admitted to be prior art by inclusion in this section.

The development of e-commerce has enabled merchants and manufacturers to electronically combine advertising and presentation of products and services with receiving orders for such products directly from a customer. Thus, manufacturers and/or sellers of products and services can both describe a product to a customer and receive electronically transmitted orders from the customer for the product, for example, through an Internet web site. In this way, e-commerce facilitates the selection and ordering process, greatly increasing sales.

However, there are still sources of friction in e-commerce that impede the completion of an online sale. For example, checkout methods available to online shoppers typically include manually filling out multi-page, multi-field forms, a process that is sufficiently time-consuming that some online shoppers are discouraged from completing a transaction. In addition, manual form completion is subject to human error, which can result in shipping and/or billing issues that create significant customer dissatisfaction with the online shipping experience.

To further reduce friction in online shopping, certain payment facilitation tools, such as PayPal™, Apple Pay™, Google Pay™, and Amazon Pay™, have been designed to reduce manual field entry. Unfortunately, to complete an online transaction, such payment facilitation tools still require additional login steps, transfer of a shopper onto a separate website associated with the payment facilitator site, and/or payment and shipping confirmation actions. Such additional actions and Internet redirections can cause delays and other friction that lower the rate of completed transactions by the online shopper. In addition, significant engineering effort is required on the part of the merchant to enable such automation for each individual payment facilitation tool, which can be problematic for smaller merchants.

Further, since in-person identity verification is impossible in an online sale, another issue with e-commerce processes is that verifying whether an online shopper is the authorized user of a credit card is more difficult for electronic transactions. As a result, the development of e-commerce has rendered credit card companies and credit card holders more vulnerable to unauthorized charges that are conducted through e-commerce processes and methods. Consequently, significant effort has been directed to the security of credit card information that is provided to merchants as part of online shopping transactions.

For example, to avoid the transmission and possible interception of credit card information used in an online credit card transaction, payment facilitators sometimes employ tokenization, a process in which the actual credit card number (and/or other credit card information) of an online shopper is not exposed to interception during an online transaction. Instead, certain sensitive transaction data (such as the credit card number, the card verification value (CVV), and the like) is replaced with a surrogate value referred to as a "token" that is mapped to the actual sensitive data. While tokens are generally infeasible to reverse in the absence of the tokenization system, the tokenization system itself presents a security hazard, in that access to the tokenization system and/or data associated with the tokenization system can potentially provide access to a very large number of credit card numbers and other sensitive data. Thus, any tokenization system must be secured and validated using security best practices for sensitive data and secure storage to prevent serious data breaches.

SUMMARY

In accordance with at least some embodiments of the present disclosure, an online purchase network enables an online purchase to be initiated and completed via a single input action by a user. That is, for a user that has registered with the online purchase network, the single input action from a user computing device causes an online transaction application running remotely from the user computing device to complete an online transaction with a merchant website with no further input from the user. Specifically, the online transaction application retrieves a first portion of user credit card information from a first storage location and a second portion of the user credit card information from a second storage location, decrypts the first portion with a first decryption key and the second portion with a second decryption key (or in some embodiments with second and third decryption keys), encrypts and temporarily stores the complete user credit card information, and publishes an order associated with user order information to a pub/sub message bus. In response to the order being published, a headless browser that is connected to the merchant website retrieves and decrypts the unified user credit card information; completes the merchant checkout process (with user order information collected by the headless browser and the complete user credit card information), and deletes, erases, or otherwise removes the temporarily stored complete credit card information. Thus, by performing a single input action, an online transaction can be completed by a user even when user credit card information, billing address, and shipping address information are not stored by or otherwise available to the merchant website.

Further embodiments include a non-transitory computer-readable storage medium comprising instructions that cause a computer system to carry out one or more of the above methods, as well as a computer system configured to carry out one or more of the above methods.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
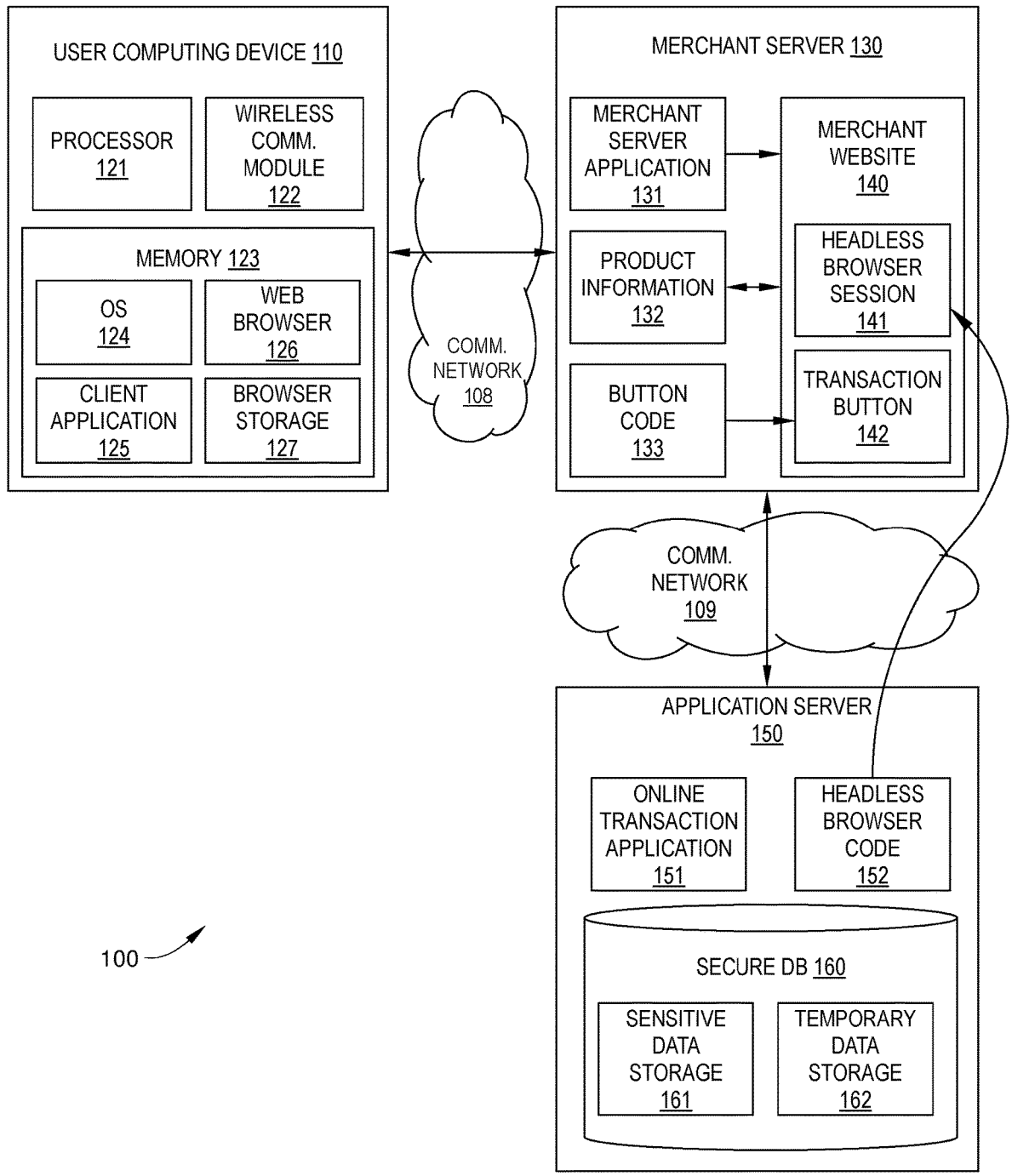
FIG. 1 is a block diagram of an online transaction network, according to one or more embodiments of the present invention.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the disclosure, as generally described herein, and illustrated in the figures, can be arranged, substituted, combined, and designed in a wide variety of different configurations, all of which are explicitly contemplated and make part of this disclosure.

FIG. 1 is a block diagram of an online transaction network 100, according to one or more embodiments of the present invention. As described below, online transaction network 100 enables an online purchase on a merchant website 140 to be initiated and completed from a user computing device 110 via a single input action by a user, such as a mouse click, via a previously programmed hot key, a voice command, a gesture, a screen swipe or tap, or any other technically feasible approach, even when user credit card information is not stored by or otherwise available to merchant website 140. Online transaction network 100 includes user computing device 110, merchant server 130, and an application server 150. User computing device 110 is communicatively coupled to merchant server 130 and/or application server 150 by a communication network 108 and merchant server 130 is communicatively coupled to application server 150 by a communication network 109. Communication network 108 and communication network 109 can each include a wireless local area network (WLAN), a cellular network, a wired communication network (such as a local area network), or any combination thereof. Furthermore, while user computing device 110 is shown in FIG. 1 to be communicatively coupled to merchant server 130 by communication network 108 and to application server 150 by communication network 109, in other embodiments, one or more additional communication networks may also be employed to communicatively couple user computing device 110, merchant server 130, and application server 150, such as the Internet, among others.

In some embodiments, a WLAN included in communication network 108 enables compatible devices to connect to the Internet, either via a wired connection or a wireless access point, or "hotspot." For example, in some embodiments, the WLAN is a WiFi network that includes one or more devices based on the Institute of Electrical and Electronics Engineers (IEEE) 802.11 standard. Thus, in such embodiments, any suitably configured wireless communication device that can connect to the WLAN, such as a smartphone or electronic tablet with WiFi capability, can perform data transfer to and from the Internet. Similarly, a cellular network included in communication network 108 enables two-way wireless communication with wireless subscriber terminals, such as user computing device 110 when user computing device 110 is configured as a smartphone.

User computing device 110 can be any technically feasible and network-connected computing device. For example, user computing device 110 can be a desktop computer, laptop computer, smartphone, personal digital assistant (PDA), tablet computer, or any other type of computing device that is configured to receive input, process data, and display images, and is suitable for practicing one or more embodiments of the present invention. Thus, user computing device 110 is configured to execute a client application 125, an operating system 124, a web browser 126, and/or other software applications. In addition, user computing device 110 is configured to communicate with merchant server 130, for example via a web browser 126.

To that end, in some embodiments, user computing device 110 includes a processor 121, a wireless communication module 122, and a memory 123. Processor 121 may be any suitable processing unit implemented as a central processing unit (CPU), an application-specific integrated circuit (ASIC), a field programmable gate array (FPGA), any other type of processing unit, or a combination of different processing units. Wireless communication module 122 may be any suitable electronics package and or chipset configured to enable wireless communication with communication network 108. Thus, in some embodiments, wireless communication module 122 includes cellular capability and WiFi capability, among others. Alternatively or additionally, in some embodiments, wireless communication module 122 includes Bluetooth capability. Alternatively or additionally, in some embodiments, user computing device 110 includes a network interface controller or other computer hardware component that connects user computing device 110 to communication network 108. Memory 123 can include any suitable volatile and/or nonvolatile memory (e.g., random-access memory (RAM), read-only memory (ROM), flash memory, a magnetic hard drive, etc.), and is configured to store instructions, data, a client application 125, an operating system (OS) 124, and/or web browser 126, etc. In some embodiments, memory 123 includes browser storage 127.

Client application 125 is a computer program designed to run on user computing device 110. Client application 125 is loaded on user computing device 110 and enables interactions with application server 150 and the storage of certain payment method information, according to embodiments described herein. OS 124 supports the functions of processor 121, including scheduling tasks and sending commands to client application 125, memory 123, and wireless communication module 122, managing the power state of user computing device 110, initiating execution of applications on processor 121, managing sockets and TCP connections, and the like. For example, in some embodiments, OS 124 is configured to facilitate the execution of web browser 126, and/or other software applications.

Merchant server 130 is configured to enable online transactions with a particular online merchant. Generally, merchant server 130 can be any entity that is separate from and can be accessed by client device 110 via communication network 108, such as via web browser 126. Merchant server 130 can be implemented as a computing device, an application running on an instance of virtual machine, and the like. For example, merchant server 130 can be a host computing device or web host service configured to provide access to and/or generate a merchant website 140. Thus, in some embodiments, merchant server 130 includes and/or executes a merchant server application 131 that generates merchant website 140. In some embodiments, merchant server 130 further includes product information 132 and executes a button code 133 that implements certain operations. In some embodiments, button code 133 incorporates a transaction button 142 on merchant website 140. In some embodiments, button code 133 receives unique product-level information from merchant website 140 when user device 126 is connected to merchant website 140 via web browser 126. Further, in some embodiments, button code 133 can track user actions to finalize product information to be used in an online transaction, such as product, size, color, etc.

Merchant website 140 enables the display and sale of products and/or services to online shoppers. For example, in some embodiments, user computing device 110 is connected to merchant website 140 via web browser 126 in the course of online shopping. In such embodiments, a user can browse through various pages of merchant website 140 that display product information 132, select a particular product or service, and then purchase the particular product or service via transaction button 142, which is displayed with the product or service. One such embodiment is described below in conjunction with FIG. 2.

Figure 2:
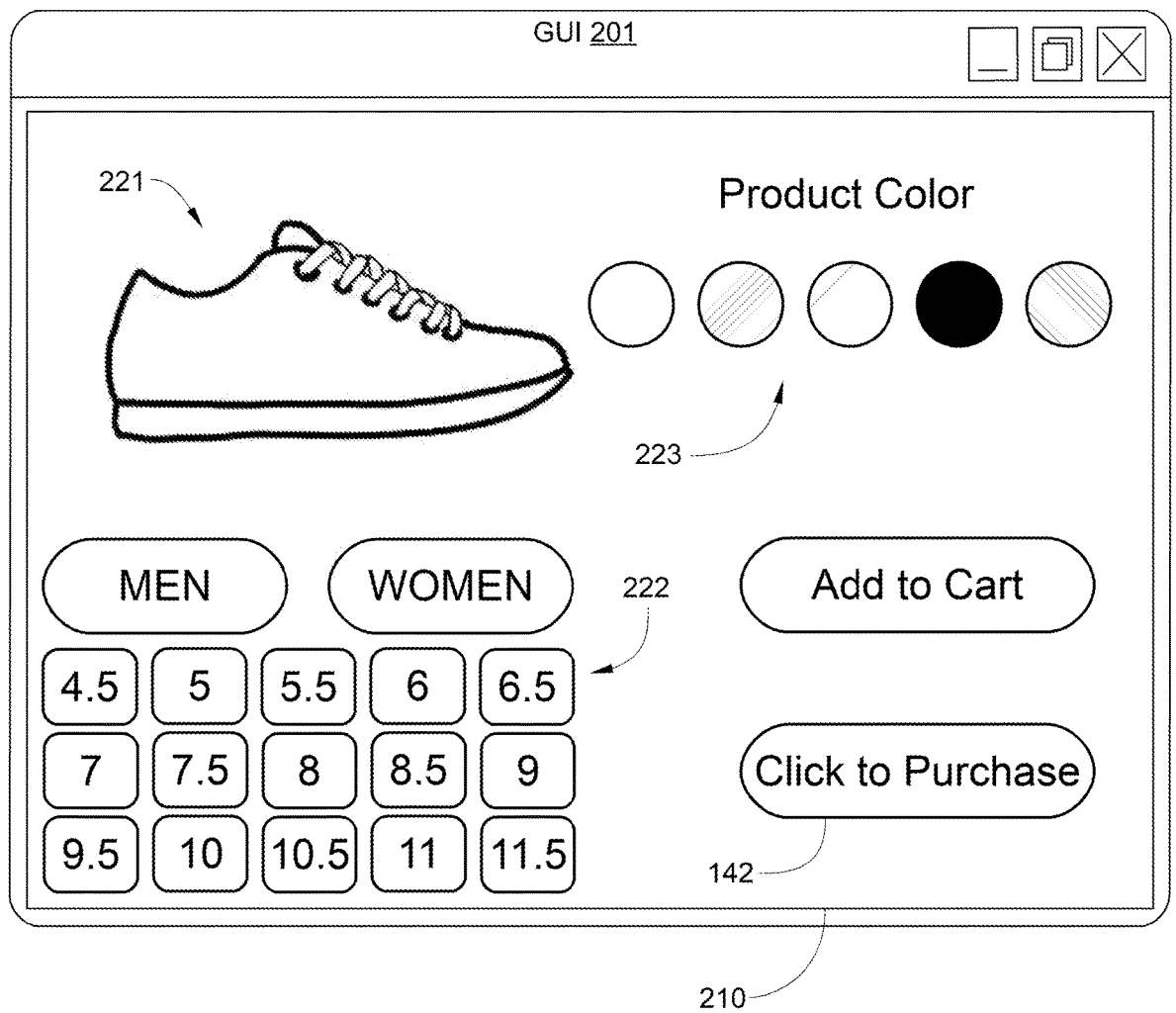
FIG. 2 illustrates a graphical user interface that displays a web page of a merchant website, according to an embodiment.

FIG. 2 illustrates a graphical user interface 201 that displays a web page 210 of merchant website 140, according to an embodiment. As shown, web page 210 displays product information associated with one or more specific products or services available from merchant website 140. For example, in the embodiment illustrated in FIG. 2, the product information displayed includes an image 221 of a particular product, available sizes 222 of the particular produce, a menu 223 of available colors, and transaction button 142.

In some embodiments, transaction button 142 (e.g., "Click to Purchase" as shown in FIG. 2) is displayed on web page 210 whenever a user device that is registered with online transaction network 100 displays web page 210. In other embodiments, transaction button 142 is displayed in response to a particular product or service associated with web page 210 being selected via a user device that is registered in online transaction network 100. In either case, according to various embodiments described herein, when a user performs an input action via transaction button 142, an online transaction for purchasing the selected product is implemented with no further actions of the part of the user.

The input action via transaction button 142 can be any suitable input action. For example, in an embodiment, the single input action performed by the user can be selection of transaction button 142 via a mouse click of user computing device 110. Alternatively or additionally, the single input action can include the highlighting and/or selection of transaction button 142 by any other technically feasible approach, such as via a previously programmed hot key, a voice command, a gesture, a screen swipe or tap, etc. In one such embodiment, the highlighting of transaction button 142 with a first key input (such as depression of a tab key until transaction button is highlighted) and selection of transaction button 142 with a second key input (such as depression of a space bar key or a carriage return key) would still constitute as a single input action. After the single input action is performed, the online transaction is then completed without further inputs by the user.

In the embodiments, manual data entry into one or more pages of multi-field forms is not performed by the user to complete the online transaction, such as credit card information, personal identifying information (PII), other billing information, shipping information, and the like. In addition, in the embodiments, the user is not directed to a payment facilitation tool or website for an abbreviated purchase confirmation process to be completed by the user. In conventional pay facilitator tools and services, a user may be required to login to an account that the user has established with the payment facilitator website, confirm payment information, and/or confirm shipping information before a particular online transaction is completed by the payment facilitator tool or service. The payment facilitator then charges the user and subsequently redistributes payment to merchant website 140 via an automated clearing house or other transaction, adding complexity to the process of completing the online transaction. Further, in the embodiments, the user is not required to login to an account associated with merchant website 140 to complete the online transaction. Thus, the online transaction can be completed by a user via transaction button 142 even when the user has not visited merchant website 140 before and/or has not established any sort of account with merchant website 140 or provided any PII or credit card information to merchant website 140.

In light of the above, online transaction network 100 of FIG. 1 benefits consumers by simplifying the online purchase processes for consumers, reducing the normal level of friction in the online purchasing process. Specifically, an online consumer can have a "one-click" shopping experience on merchant website 140 without establishing an account on or providing sensitive information to merchant website 140. Online transaction network 100 also benefits online merchants by enabling such merchants to more effectively compete with larger online competitors: the complexity and cost of online transactions is reduced, and, through the streamlined process associated with transaction button 142, website conversion rates for a merchant is increased. For example, the online merchant associated with merchant website 140 is not required to create a specialized product-level application programming interface (API) for merchant website 140 that programmatically identifies specific products.

Returning to FIG. 1, application server 150 is configured to implement certain encryption, decryption, and other operations to enable various embodiments described herein. Such operations include encryption and decryption of portions of payment method information; retrieval of encrypted portions of payment method information; receipt of payment method information from client device 110; delivery of an encrypted portion of payment method information to client device 110; causing a headless browser operation to be connected to merchant website 140; and/or informing the headless browser operation, via a messaging methodology, that an order has been placed, for example by placing order information into a pub/sub message bus to initiate an online order processing function, among others. Generally, application server 150 can be any entity that is separate from and can be accessed by client device 110 via communication network 108 and merchant server 130 via communication network 109. Thus, in some embodiments, application server 150 can be implemented as a computing device, an application running on an instance of a virtual machine, and the like.

Application server 150 includes one or more of an online transaction application 151, headless browser code 152, and, in some embodiments, a secure database 160. Online transaction application 151 is configured to perform the various operations associated with application server 150 as described herein.

Headless browser code 152 is configured to, upon execution, establish a headless browser session 141 (e.g., a browser session without a graphical user interface) with a specific merchant website 140 on which button code 133 is deployed and to which a user computing device 110 is connected via web browser 126. In some embodiments, headless browser code 152 is executed when web browser 126 connects to a merchant website 140 on which button code 133 is deployed. In such embodiments, client application 125 may notify online transaction application 151 that headless browser code 152 can establish headless browser session 141 with merchant website 140. Headless browser session 141 is configured to receive data of the user, such as product information, that is collected by button code 133 when a user selects a specific product on merchant website 140. Headless browser code 152 is configured to, upon selection of transaction button 142 via a user input action, complete a checkout on behalf of user computing device 110 by completing the merchant checkout process with user information stored in secure database 160, payment information stored in temporary data storage 162 of secure database 160, and order information received from button code 133. Thus, headless browser code 152 can compensate for the inability of merchant website 140 to accept third-party payment information via API, identify product-level information via API, and/or allow a third party to execute a checkout process on behalf of the user operating user computing device 110 via API. Specific operations performed by headless browser code 152 are described in greater detail below in conjunction with FIGS. 5A, 5B, and 6.

Secure database 160 may be a structured query language (SQL) compatible database or other relational database. As shown, secure database 160 is configured with sensitive data storage 161 and temporary data storage 162. In the embodiment illustrated in FIG. 1, secure database 160 is incorporated in application server 150. In other embodiments, secure database 160 can be implemented in a computing device that is separate from application server 150.

Sensitive data storage 161 is configured to store encrypted payment method information for a plurality of payment methods, where each payment method is associated with a different credit card account and user. Specifically, for a particular user and a particular payment method, sensitive data storage 161 is configured to store a first encrypted portion of payment method information and a decryption key for a second encrypted portion of the payment information. For example, in some embodiments, the first encrypted portion of payment method information includes a primary account number for a credit card account of the user and/or a card expiration date associated with the primary account number for the credit card account. It is noted that each first encrypted portion of payment method information stored in sensitive data storage 161 is encrypted with a different decryption key. As a result, unauthorized access to sensitive data storage 161 cannot yield useful sensitive information, such as primary account numbers, unless a separate decryption key has been determined for each first encrypted portion of payment method information. In addition, complete payment method information is not included in sensitive data storage 161, which further enhances the security of data stored therein. For example, only one of a primary account number and a card verification value (CVV) is stored in sensitive data storage 161 as the first encrypted portion of payment method information. In some embodiments, sensitive data storage 161 is further configured to store PII and other user information for a plurality of users, such as name, billing address, shipping address, and, in some embodiments, a preferred payment method for one or more previously visited merchant websites 140.

Temporary data storage 162 is configured to store an encrypted version of a complete set of payment method information for a particular payment method and for a particular online transaction. For example, in an embodiment, the complete set of payment method information for a particular payment method in an embodiment includes a primary account number, a CVV associated with the primary account number, and an expiration data associated with the primary account number. According to various embodiments, the encrypted version of the complete set of payment method information is deleted, erased, or otherwise removed from temporary storage 162 by headless browser code 152 upon completion of the online transaction associated with the complete set of payment method information.

In some embodiments, a user registration process is performed by online transaction network 100 to enable a particular user to subsequently initiate and complete an online transaction with a single input action at any merchant website 140 that includes button code 133. One embodiment of such a user registration process is described below in conjunction with FIGS. 3 and 4.

Figure 3:
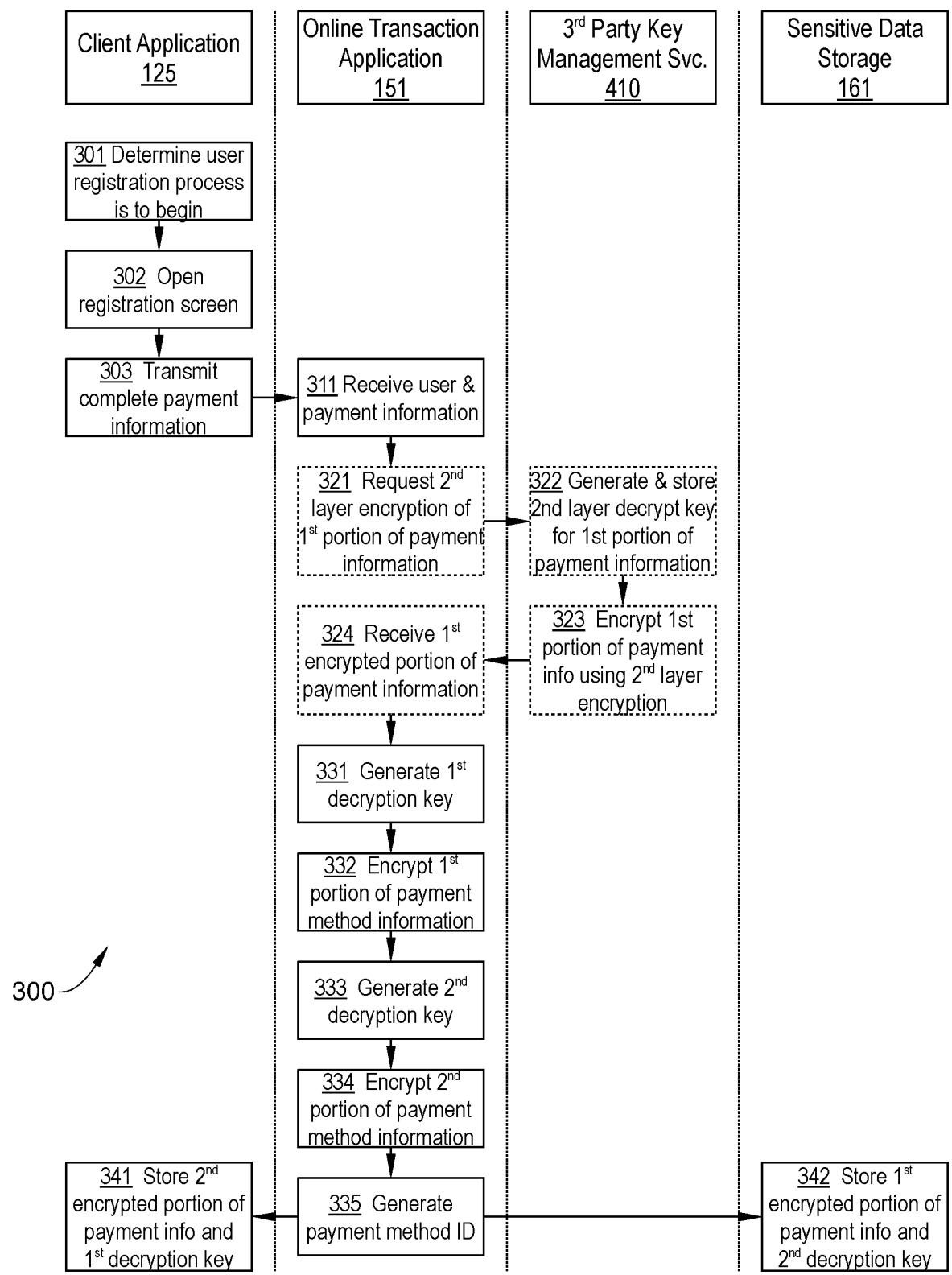
FIG. 3 is a flowchart illustrating the steps performed by the online transaction network of FIG. 1 as part of a user registration process, according to various embodiments.
Figure 4:
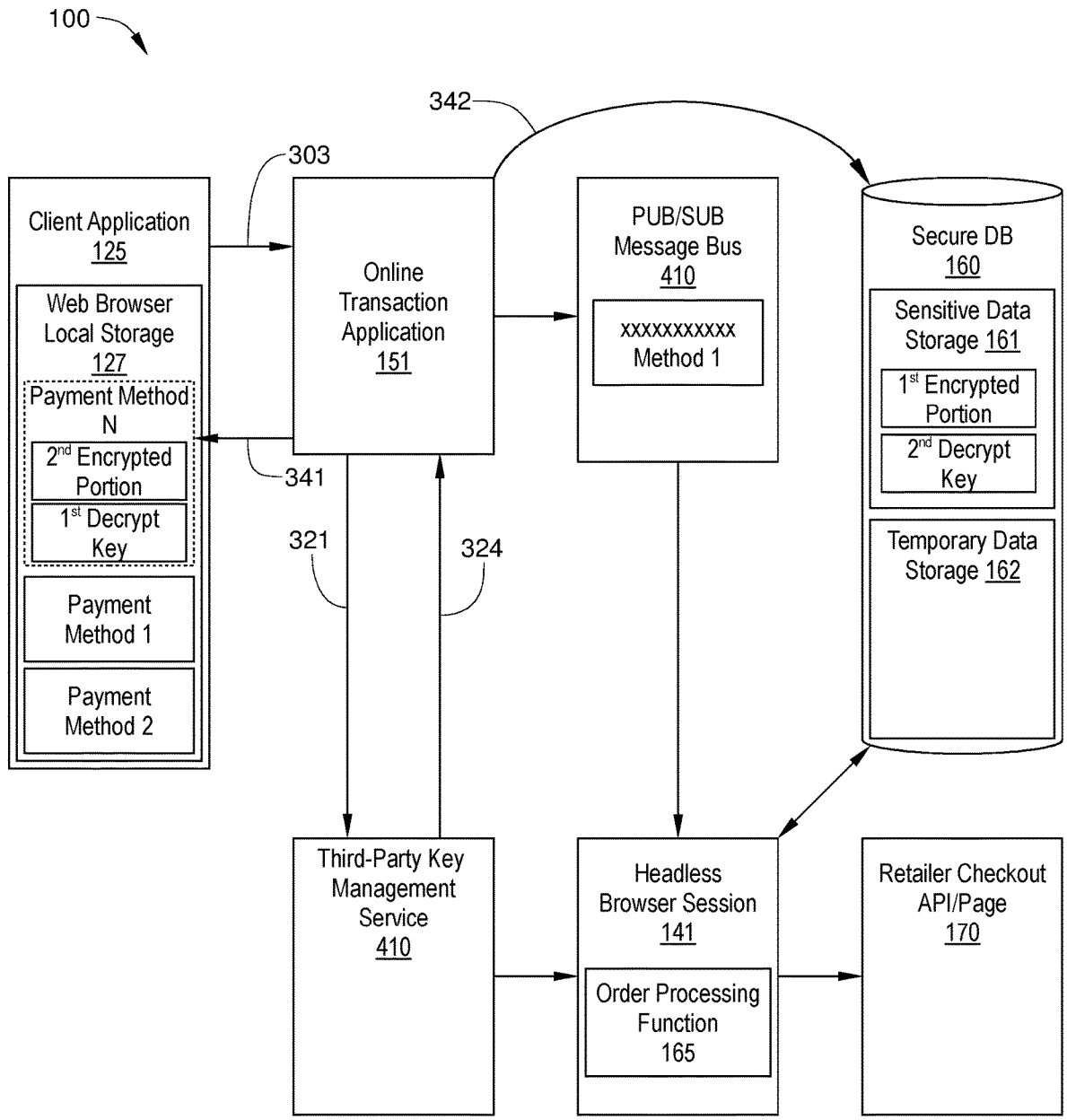
FIG. 4 is an operational diagram illustrating certain steps of the user registration process of FIG. 3 within an online transaction network, according to various embodiments.

FIG. 3 is a flowchart illustrating the steps performed by online transaction network 100 as part of a user registration process 300, according to various embodiments. FIG. 4 is an operational diagram illustrating certain steps of user registration process 300 within online transaction network 100, according to various embodiments. User registration process 300 may include one or more operations, functions, or actions as illustrated by one or more of blocks 301-342. Although the blocks are illustrated in a specific order, these blocks may be performed in parallel, and/or in a different order than those described herein. Also, the various blocks may be combined into fewer blocks, divided into additional blocks, and/or eliminated based upon a specific implementation. Although the method is described in conjunction with online transaction network 100 of FIG. 1, persons skilled in the art will understand that within the scope of the present disclosure any suitably configured system can perform user registration process 300.

In user registration process 300, steps are performed in sequence by client application 125, online transaction application 151, and, in some embodiments, a third-party key management service 410. In some embodiments, user registration process 300 is performed for each payment method to be associated with a particular user on user computing device 110. Thus, in such embodiments, user registration process 300 may be performed multiple times by a particular user when the user is to be associated with multiple payment methods.

User registration process 300 begins at step 301, where client application 125 determines that a user registration process is to begin. In some embodiments, client application 125 makes such a determination based on a user input at user computing device 110, such as selection of transaction button 142 when the current user of user computing device 110 has no previously registered payment method in browser storage 127. Thus, in such an embodiment, step 301 is performed when a user first attempts to purchase a product or service via transaction button 142 and user computing device 110. Alternatively or additionally, in some embodiments, client application 125 makes such a determination based on a user input at user computing device 110 indicating that the user has requested to register a payment method on computing device 110, such as an additional payment method.

In step 302, client application 125 causes a registration screen or window to be displayed on user computing device 110 and receives user information (e.g., name, billing address, shipping address, and the like) and complete payment method information (e.g., a primary account number for a particular credit card account, a CVV associated with that particular credit card account, and an expiration date associated with that particular credit card account). In instances in which the current user has no one-click purchase network ID associated with user computing device 110, client application 125 generates a one-click purchase network ID for the user. Subsequently, multiple payment methods can then be associated with the current user via the one-click purchase network ID. In instances in which the current user already has a one-click purchase network ID associated with user computing device 110, some or all user information collected by the registration screen may be automatically filled in for the payment method currently being registered.

In step 303, client application 125 transmits the complete payment method information and user information associated with the complete payment method information to online transaction application 151.

In step 311, online transaction application 151 receives the complete payment method information and associated user information from client application 125. In some embodiments, online transaction application 151 then performs optional steps 321-324 to enable two-layer encryption of a first portion of payment method information. In other embodiments, first portion of payment method information does not undergo two-layer encryption and online transaction application 151 proceeds to step 331.

In optional step 321, online transaction application 151 requests a second layer of encryption for a first portion of the payment method information received in step 311. In some embodiments, online transaction application 151 makes a call to a third-party key management service 410 (shown in FIG. 4) for the second-layer encryption of the first portion of the payment method information, such as Cloud KMS (a cloud-hosted key management service that enables management of cryptographic keys). In such embodiments, the first portion of the payment method information is transmitted to the third-party key management service. In some embodiments, the first portion of the payment method information includes the primary account number received in step 311, and not the CVV associated with that primary account number. In some embodiments, the first portion of the payment method information further includes an expiration data associated with the primary account number received in step 311.

In optional step 322, third-party key management service 410 generates and stores a second-layer decryption key (referred to herein as the "third decryption key") for the first portion of the payment method information. In optional step 323, third-party key management service 410 encrypts the first portion of the payment method information received from online transaction application 151. Thus, third-party key management service 410 generates a first encrypted portion of the payment method information. In optional step 324, online transaction application 151 receives the first encrypted portion of the payment method information from third-party key management service 410. In some embodiments, online transaction application 151 also receives and stores the third decryption key. In such embodiments, the third decryption key may itself be encrypted prior to being stored.

In step 331, online transaction application 151 generates an decryption key (referred to herein as the "first decryption key") for the first layer encryption of the first encrypted portion of the payment method information. In some embodiments, the first decryption key is a symmetric decryption key. In step 332, online transaction application 151 encrypts the first portion of the payment method information using the first decryption key. In some embodiments, the first decryption key is a symmetric decryption/encryption key, and is generated via any technically feasible encryption algorithm, such as Golang. It is noted that in embodiments in which second layer encryption of the first portion payment method information is performed, in step 323 the first portion of the payment method information is encrypted (via the third decryption key) before online transaction application 151 further encrypts the first portion of the payment method information using the first decryption key.

In step 333, online transaction application 151 generates a decryption key (referred to herein as the "second decryption key") for the encryption of the second encrypted portion of the payment method information. For example, in some embodiments, the second portion of the payment method includes the CVV for a primary account number but not the primary account number itself. In some embodiments, the second decryption key is a symmetric encryption/decryption key, and is generated via any technically feasible encryption algorithm, such as Golang. In step 334, online transaction application 151 encrypts the second portion of the payment method information using the second decryption key. In this way, online transaction application 151 generates a second encrypted portion of the payment method information.

In step 335, online transaction application 151 generates a payment method ID N. Payment method ID N differentiates the payment method currently being registered from other payment methods that are also associated with the current user and are stored in user computing device 110. For example, in the instance illustrated in FIG. 4, user computing device 110 already stores certain information for two other payment methods (payment method 1 and payment method 2) associated with the current user. Specifically, for each such payment method, user computing device 110 stores a second encrypted portion of payment method information and a decryption key for a first encrypted portion of the payment method information. Thus, in conjunction with encrypted payment method information stored in sensitive data storage 161 (see step 342 below), a user can have access to multiple different payment methods on a single user computing device 110. In some embodiments, each payment method for which data are stored by user computing device 110 can be associated with a particular merchant website 140. For example, in one such embodiment, the payment method associated with a particular merchant website 140 serves as a default payment method for that particular merchant website 140.

In step 341, online transaction application 151 transmits the second encrypted portion of payment information and the first decryption key to user computing device 110. User computing device 110 then stores the second encrypted portion of the payment information and the first decryption key in browser storage 127, as shown. In step 342, online transaction application 151 transmits the first encrypted portion of the payment information and the second decryption key to sensitive data storage 161 for storage in secure database 160. In some embodiments, the information stored in browser storage 127 and in sensitive data storage 161 in this way can be tracked based on a payment method ID value, which for example can be assigned by online transaction application 151.

As shown, upon completion of user registration process 300 for a particular payment method (e.g., payment method N), a decryption key for the first encrypted portion of the payment method information is stored in one computing device (e.g., user computing device 110, as shown, or in a third-party computing device) while the first encrypted portion of the payment method information is stored in a separate computing device (e.g., application server 150 or some other computing device associated with secure database 160). Similarly, a decryption key for the second encrypted portion of the payment method information is stored in one computing device (e.g., application server 150 or some other computing device associated with secure database 160) while the second encrypted portion of the payment method information is stored in a separate computing device (e.g., user computing device 110, as shown, or in a third-party computing device). Thus, a security breach in any of user computing device 110, the third-party computing device, application server 150, or secure database 160 does not allow access to complete payment method information for a particular credit card account. It is noted that the primary account number for a particular credit card account is not included in the same portion of the payment method information as the CVV for that particular credit card account. Thus, inclusion of the CVV in the portion of the payment method information that is stored in user computing device 110 enables online transaction network 100 to be in compliance with the payment card industry data security standard, since the CVV is not stored in a centralized server or database after completion of an online transaction.

In some embodiments, when a user selects transaction button 142 while connected to a merchant website 140, headless browser session 141 is employed to complete the online transaction process. Specifically, headless browser session 141 retrieves and decrypts first and second portions of the appropriate payment method information, completes the merchant checkout process (with user order information collected by the headless browser and the complete user credit card information), and deletes or otherwise removes the complete user credit card information. One such embodiment is described below in conjunction with FIGS. 5A, 5B, and 6.

Figure 5A:
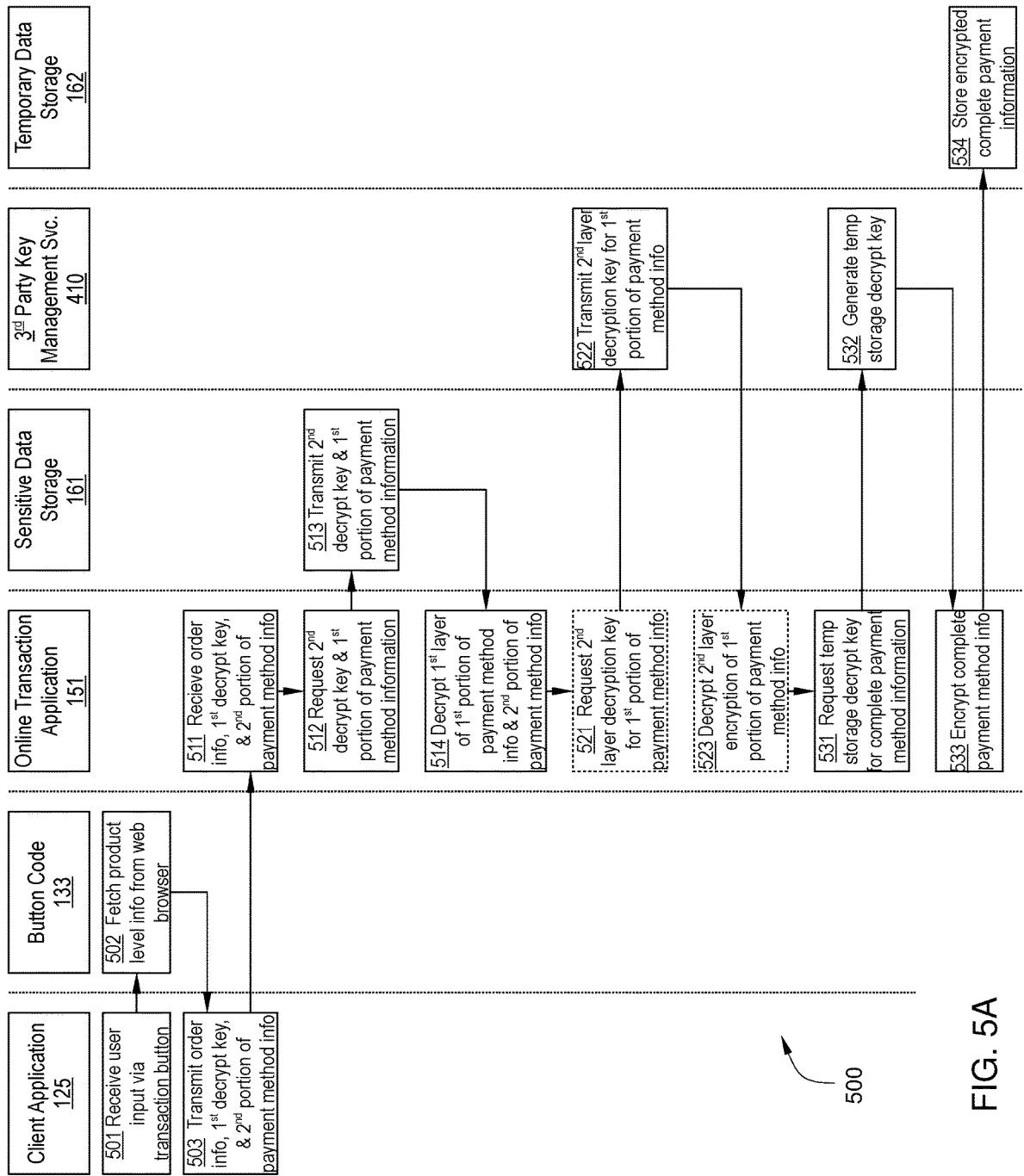
FIGS. 5A and 5B show flowcharts illustrating the steps performed by the online transaction network of FIG. 1 as part of an online transaction process, according to various embodiments.
Figure 5B:
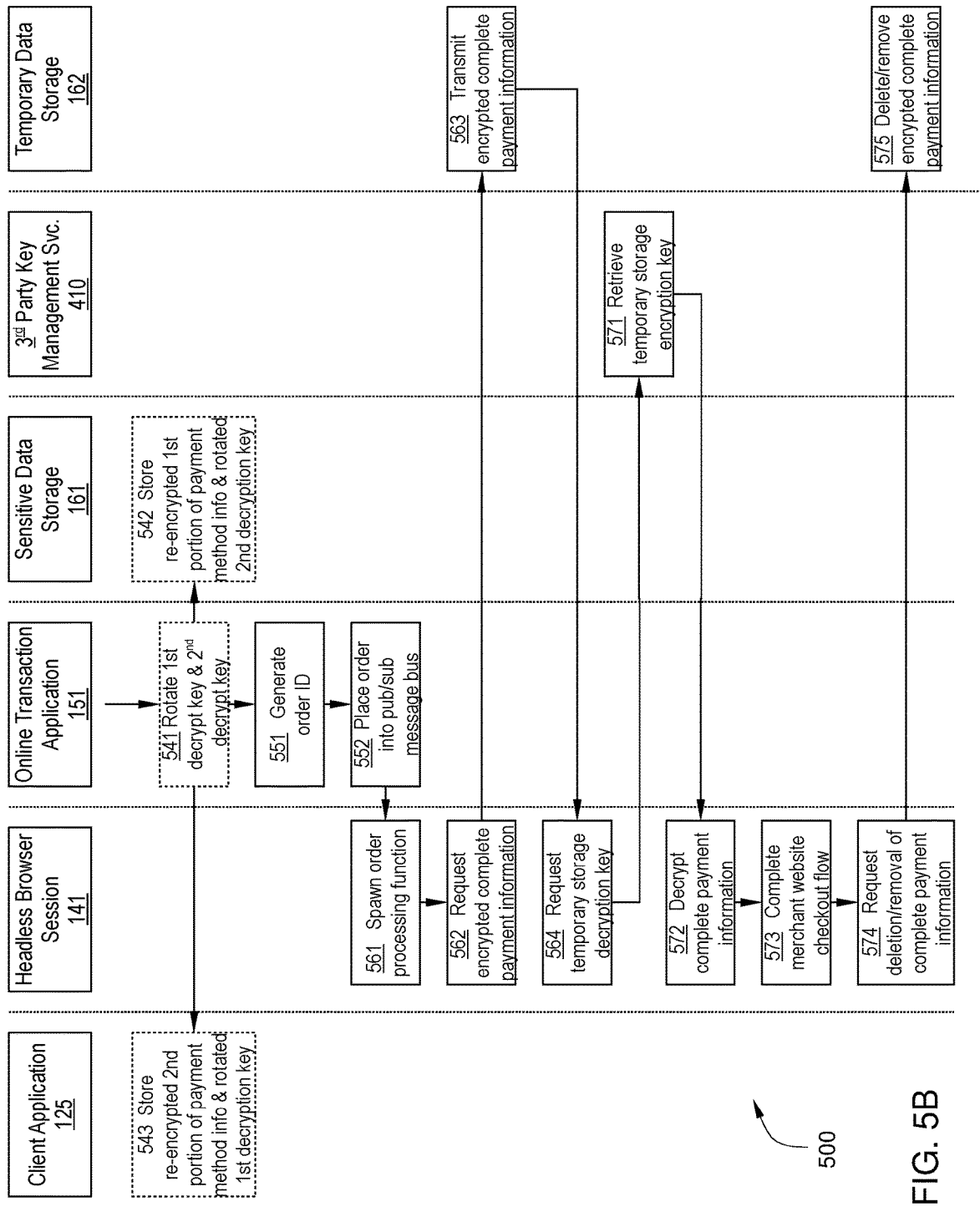
Figure 6:
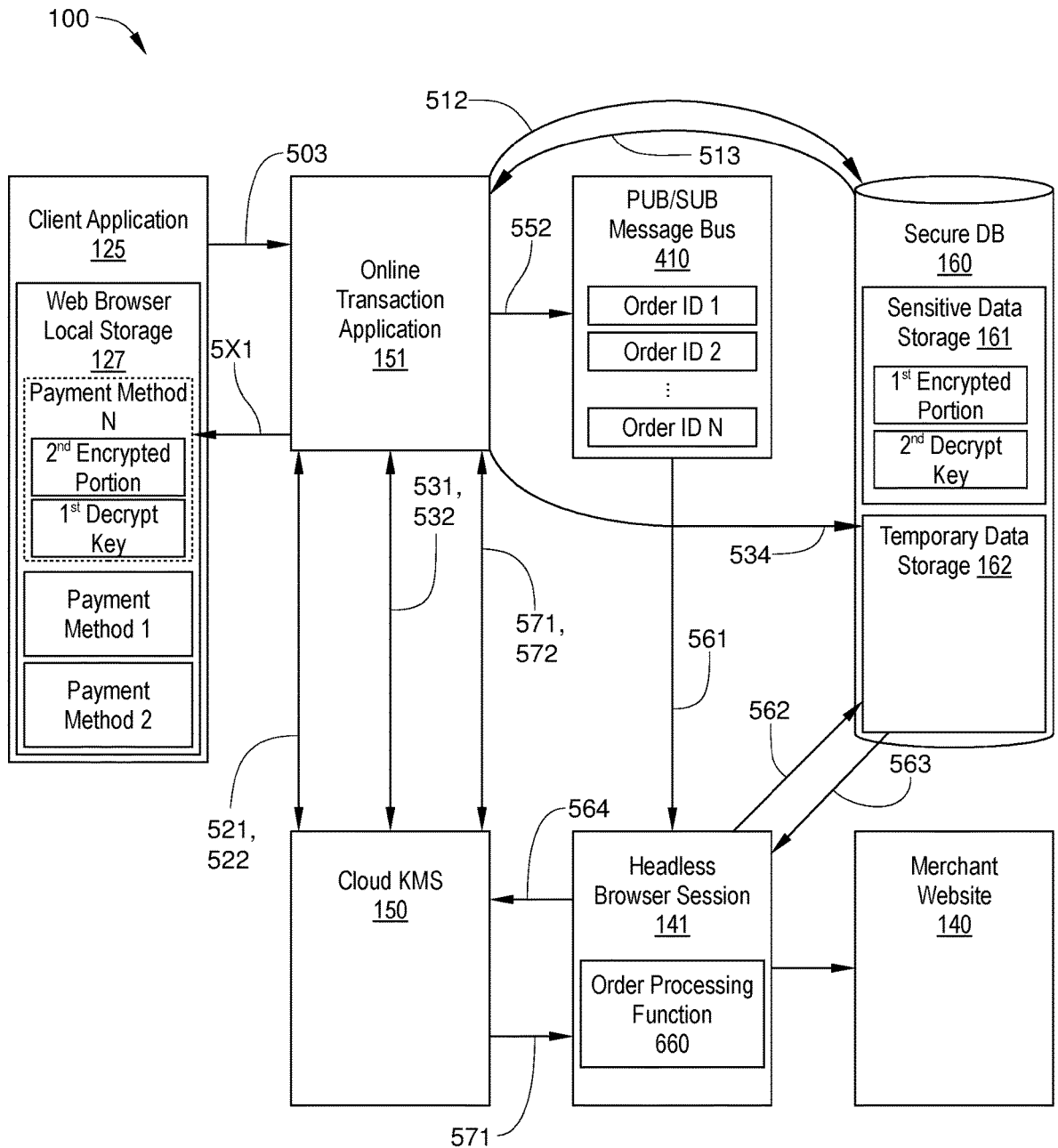
FIG. 6 is an operational diagram illustrating certain steps of the online transaction process of FIG. 5 within an online transaction network, according to various embodiments.

FIGS. 5A and 5B show flowcharts illustrating the steps performed by online transaction network 100 as part of an online transaction process 500, according to various embodiments. FIG. 6 is an operational diagram illustrating certain steps of online transaction process 500 within online transaction network 100, according to various embodiments. Online transaction process 500 may include one or more operations, functions, or actions as illustrated by one or more of blocks 501-575. Although the blocks are illustrated in a specific order, these blocks may be performed in parallel, and/or in a different order than those described herein. Also, the various blocks may be combined into fewer blocks, divided into additional blocks, and/or eliminated based upon a specific implementation. Although the method is described in conjunction with online transaction network 100 of FIG. 1, persons skilled in the art will understand that within the scope of the present disclosure any suitably configured system can perform online transaction process 500.

In online transaction process 500, steps are performed in sequence by client application 125, button code 133, online transaction application 151, headless browser session 141, and third-party key management system 410.

Online transaction process 500 begins at step 501, where client application 125 receives a user input action via transaction button 142, such as when a user mouse clicks transaction button 142 to initiate and complete an online transaction on merchant website 140. In step 502, button code 133 fetches product-level information from web browser 126. In step 503, client application 125 initiates an online transaction by sending certain information to online transaction application 151. Specifically, client application transmits order information, including the product-level information collected in step 502, a payment method ID value, a first decryption key associated with the payment method ID, and a second encrypted portion of payment method information associated with the payment method ID.

In step 511, online transaction application 151 receives the order information and the payment method information (e.g., the payment method ID value, the first decryption key associated with the payment method ID, and the second encrypted portion of payment method information associated with the payment method ID). In response, in step 512, online transaction application 151 requests certain information from sensitive data storage 161 based on the payment method ID received. Namely, online transaction application 151 requests the second decryption key associated with the payment method ID and the first encrypted portion of payment method information associated with the payment method ID. In step 513, the requested second decryption key and first encrypted portion of payment method information are fetched from sensitive data storage 161. In step 514, online transaction application 151 decrypts the first encrypted portion of payment method information using the first decryption key and the second encrypted portion of payment method information using the second decryption key. In some embodiments, online transaction application 151 then performs optional steps 521-523 to reverse two-layer encryption of the first portion of payment method information. In other embodiments, when first portion of payment method information is not encrypted with two-layer encryption, online transaction application 151 does not perform optional steps 521-523 and online transaction application 151 proceeds to step 531.

In step 521, online transaction application 151 requests the second-layer decryption key (i.e., the third decryption key) for the first portion of the payment method information from third-party key management service 410. Alternatively, in some embodiments, online transaction application 151 stores the third decryption key locally and does not need to request the third decryption key from third-party key management service 410. In optional step 522, third-party key management service 410 transmits the third decryption key (i.e., the second-layer decryption key) to online transaction application 151. In optional step 523, online transaction application 151 decrypts the second layer of encryption of the first portion of the payment method information. Thus, upon completion of step 523, the first portion and the second portion of the payment method information are decrypted, and complete payment information is available to online transaction application 151.

In step 531, online transaction application 151 requests from third-party key management service 410 a temporary storage decryption key for the complete payment information. In step 532, third-party key management service 410 generates a temporary storage decryption key and transmits the decryption key to online transaction application 151. In step 533, online transaction application 151 encrypts the complete payment method information using the temporary storage decryption key to generate an encrypted version of the complete payment method information. In step 534, online transaction application 151 stores the encrypted version of the complete payment method information in temporary data storage 162.

In some embodiment, decryption keys employed in user registration process 300 and online transaction process 500 are single-use tokens, which are rotated after a single use. In such embodiments, online transaction application 151 performs optional steps 541-543 (see FIG. 5B) for added security of payment method information stored in browser storage 127 and sensitive data storage 161. In step 541, online transaction application 151 rotates the first decryption key and the second decryption key. Online transaction application 151 also re-encrypts the first portion of the payment method information with the new version of the first decryption key and re-encrypts the second portion of the payment method information with the new version of the second decryption key. In embodiments in which two-layer encryption is employed for the first portion of the payment method information, a second layer of encryption is performed on the first portion of the payment method information before the first portion of the payment method information is encrypted with the first decryption key. In step 542, online transaction application 151 stores the re-encrypted first portion of payment method information and the rotated second decryption key in sensitive data storage 161. In step 543, online transaction application 151 stores the re-encrypted second portion of payment method information and the rotated first decryption key in browser storage 127.

In step 551, after the complete payment method information is stored in temporary data storage 162, online transaction application 151 generates an order ID. In some embodiments, the order ID is mapped to the order information and/or the payment method ID value received in step 511. In step 552, online transaction application 151 informs headless browser session 141 operation via a messaging methodology that an order has been placed. For example, in the embodiment illustrated in FIG. 6, online transaction application 151 places the order ID into a pub/sub message bus 610, to which headless browser code 152 subscribes. In other embodiments, any technically feasible messaging methodology can be used.

In step 561, headless browser session 141 spawns an order processing function 660 (shown in FIG. 6) based on the placement of an appropriate order ID into pub/sub message bus 610. In step 562, headless browser session 141 requests from temporary data storage 162 the complete method payment information that is associated with the order placed into pub/sub message bus 610 in step 552. In step 563, temporary data storage 162 transmits the encrypted version of the complete payment method information stored therein to headless browser session 141. In step 564, headless browser session 141 requests from third-party key management service 410 the temporary storage decryption key for the encrypted version of the complete payment information.

In step 571, third-party key management service 410 retrieves and transmits to the headless browser session 141 the temporary storage decryption key for the encrypted version of the complete payment information. In step 572, headless browser session 141 decrypts the complete payment information. In step 573, headless browser session 141 completes the website checkout flow for merchant website 140 using the complete payment information decrypted in step 572 and the order information received by online transaction application 151 in step 511. In some embodiments, headless browser session 141 also completes a portion of the website checkout flow for merchant website 140 using user information stored in sensitive data storage 162 prior to the initiation of the online transaction. In step 574, in response to the completion of the online transaction with merchant website 140, headless browser session 141 requests the deletion or removal of the encrypted version of the complete payment method information stored in temporary data storage 162. In step 575, the complete payment method information stored in temporary data storage 162 is deleted, erased, and/or otherwise removed from temporary data storage 162.

Online transaction process 500 ensures that complete payment information is only stored in a consolidated form (i.e., not broken into multiple portions) for a short time interval, i.e., the time required to electronically complete an online transaction. For example, in many instances, the complete payment information is only stored in temporary data storage 162 for a time interval having a duration on the order of a fraction of a second to a few seconds. Further, during that time interval, the complete payment information is only stored in encrypted form. Consequently, there is little exposure to a data breach of the complete payment information during or after any given online transaction.

In the embodiments, transmission/fetching of information between various entities can be implemented using cookie- and/or pub/sub-based techniques. Alternatively or additionally, in some embodiments other approaches can be employed, including inline frames (iframes) and/or redirection to certain websites, and/or tokenization of certain information being transmitted.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method of completing an online transaction that is performed via a user computing device and a merchant website running on a merchant computing device, the method comprising:
    receiving order information, a first decryption key, and a second encrypted portion of payment method information from the user computing device;
    in response to receiving the order information, requesting a second decryption key and a first encrypted portion of the payment method information from a computing device that is separate from the user computing device and the merchant computing device;
    decrypting the first encrypted portion of the payment method information with the first decryption key to generate a decrypted first portion and decrypting the second encrypted portion of the payment method information with the second decryption key to generate a decrypted second portion;
    encrypting the decrypted first portion and the decrypted second portion with a third decryption key as encrypted payment method information;
    storing the encrypted payment method information; and
    after storing the encrypted payment method information, completing an online merchant checkout process for the merchant website using the order information, the decrypted first portion, and the decrypted second portion,
    wherein completing the online merchant checkout process for the merchant website comprises causing a headless browser session that is connected to the merchant website to:
        retrieve the third decryption key from a key management service; and
        decrypt the encrypted payment method information.

2. The computer-implemented method of claim 1, wherein the third decryption key comprises a decryption key generated by a key management service.

3. The computer-implemented method of claim 1, wherein completing the online merchant checkout process for the merchant website comprises: retrieving the third decryption key from a key management service; and decrypting the encrypted payment method information.

4. The computer-implemented method of claim 1, further comprising, after completing the online merchant checkout process, deleting the encrypted payment method information.

5. The computer-implemented method of claim 1, further comprising:
    receiving a first payment method ID value with the first decryption key and the second encrypted portion of the payment method information; and
    requesting the second decryption key and the first encrypted portion of the payment method information based on the first payment method ID value.

6. The computer-implemented method of claim 5, wherein the first payment method ID value is one of a plurality of payment method ID values stored in the user computing device.

7. The computer-implemented method of claim 1, wherein the first encrypted portion of the payment method information comprises at least one of a primary account number or an expiration date associated with the primary account number, and the second encrypted portion of the payment method information comprises a card verification value associated with the primary account number.

8. The computer-implemented method of claim 1, wherein the first decryption key is stored in the user computing device prior to receiving the order information.

9. The computer-implemented method of claim 1, wherein the order information, the first decryption key, and the second encrypted portion of the payment method information are transmitted from the user computing device in response to a single user input action.

10. The computer-implemented method of claim 1, further comprising, prior to receiving the order information, causing the order information to be collected via a headless browser session connected to the merchant website.

11. The computer-implemented method of claim 10, wherein the headless browser session collects the order information from a web browser that is running on the user computing device and is connected to the merchant website.

12. A computer-implemented method of completing an online transaction that is performed via a user computing device and a merchant website running on a merchant computing device, the method comprising:
    causing order information to be collected via a headless browser session connected to the merchant website, wherein the headless browser session collects the order information from a web browser that is running on the user computing device and is connected to the merchant website;
    receiving the order information, a first decryption key, and a second encrypted portion of payment method information from the user computing device;
    in response to receiving the order information, requesting a second decryption key and a first encrypted portion of the payment method information from a computing device that is separate from the user computing device and the merchant computing device;
    decrypting the first encrypted portion of the payment method information with the first decryption key to generate a decrypted first portion and decrypting the second encrypted portion of the payment method information with the second decryption key to generate a decrypted second portion; and completing an online merchant checkout process for the merchant website using the order information, the decrypted first portion, and the decrypted second portion.

13. The computer-implemented method of claim 1, further comprising, prior to completing the online merchant checkout process:

encrypting the decrypted first portion and the decrypted second portion with a third decryption key as encrypted payment method information; and storing the encrypted payment method information.

14. The computer-implemented method of claim 13, wherein the third decryption key comprises a decryption key generated by a key management service.

15. The computer-implemented method of claim 13, wherein completing the online merchant checkout process for the merchant website comprises:

retrieving the third decryption key from a key management service; and decrypting the encrypted payment method information.

16. The computer-implemented method of claim 13, further comprising, after completing the online merchant checkout process, deleting the encrypted payment method information.

17. The computer-implemented method of claim 13, wherein completing the online merchant checkout process for the merchant website comprises causing the headless browser to:

retrieve the third decryption key from a key management service; and decrypt the encrypted payment method information.

18. The computer-implemented method of claim 13, further comprising:

receiving a first payment method ID value with the first decryption key and the second encrypted portion of the payment method information; and requesting the second decryption key and the first encrypted portion of the payment method information based on the first payment method ID value.

19. The computer-implemented method of claim 18, wherein the first payment method ID value is one of a plurality of payment method ID values stored in the user computing device.

20. The computer-implemented method of claim 13, wherein the first encrypted portion of the payment method information comprises at least one of a primary account number or an expiration date associated with the primary account number, and the second encrypted portion of the payment method information comprises a card verification value associated with the primary account number.

21. The computer-implemented method of claim 13, wherein the first decryption key is stored in the user computing device prior to receiving the order information.

* * * * *